US012623497B1

(12) United States Patent (10) Patent No.: US 12,623,497 B1

Pridgen (45) Date of Patent: May 12, 2026

(54) AUTOMATED TRAILER HITCH

(71) Applicant: Douglas Robinson, Royse City, TX (US)

(72) Inventor: Brandon Wade Pridgen, Plano, TX (US)

(73) Assignee: Douglas Robinson, Royse City, TX (US)

( * ) Notice: Subject to any disclaimer, the term of this patent is extended or adjusted under 35 U.S.C. 154(b) by 0 days.

(21) Appl. No.: 19/370,132

(22) Filed: Oct. 27, 2025

(51) Int. Cl.
B60D 1/06 (2006.01)

(52) U.S. Cl.
CPC ...................................... B60D 1/06 (2013.01)

(58) Field of Classification Search
CPC . B60D 1/06; B60D 1/24; B60D 1/246; B60D 1/54
See application file for complete search history.

(56) References Cited

U.S. PATENT DOCUMENTS

| | | | | |
|---|---|---|---|---|
| 4,256,324 | A | * | 3/1981 | Hamilton ................. B60D 1/54 |
| | | | | 280/433 |
| 4,540,194 | A | * | 9/1985 | Dane ........................ B60D 1/54 |
| | | | | 280/901 |
| 5,435,585 | A | * | 7/1995 | Chambers ................ B60D 1/54 |
| | | | | 280/901 |
| 5,755,452 | A | * | 5/1998 | Tambornino ............. B60D 1/54 |
| | | | | 280/901 |

| | | | | |
|---|---|---|---|---|
| 5,788,258 | A | * | 8/1998 | Gill .......................... B60D 1/54 |
| | | | | 280/901 |
| 5,860,671 | A | * | 1/1999 | Mackeown .............. B60D 1/54 |
| | | | | 280/491.5 |
| 5,893,575 | A | * | 4/1999 | Larkin ..................... B60D 1/28 |
| | | | | 280/901 |
| 5,906,387 | A | * | 5/1999 | Wallace ................... B60D 1/54 |
| | | | | 280/491.1 |
| 6,199,890 | B1 | * | 3/2001 | Lindenman ............ B60D 1/586 |
| | | | | 280/491.1 |
| 6,409,202 | B1 | * | 6/2002 | Putnam ................... B60D 1/06 |
| | | | | 280/495 |
| 2003/0042708 | A1 | * | 3/2003 | Tambornino ............. B60D 1/54 |
| | | | | 280/491.1 |
| 2009/0224511 | A1 | * | 9/2009 | Dick ........................ B60D 1/54 |
| | | | | 280/511 |
| 2012/0091690 | A1 | * | 4/2012 | Tambornino ............. B60D 1/06 |
| | | | | 280/491.1 |

(Continued)

*Primary Examiner* — Valentin Neacsu

*Assistant Examiner* — Abigail R Hymel

(74) *Attorney, Agent, or Firm* — Stephen Y. Liu; James H. Ortega; Carstens, Allen & Gourley, LLP

(57) ABSTRACT

The disclosed principles provide for a trailer hitch apparatus and related methods of operation and manufacturing. In one embodiment, the trailer hitch apparatus includes a plate with a cutout, a housing, a hitch ball, and a cover. The cutout may feature a first receding portion, while the housing includes sidewalls that support the hitch ball, which can rotate between an upright and collapsed position via a rod connected to the sidewalls. The cover is rotatably attached with a second rod and has a second receding section that aligns with the first receding portion to accommodate the shank when the hitch ball is upright. The apparatus also includes a hitch ball actuator and a cover actuator. The hitch ball actuator shifts the hitch ball between positions, while the cover actuator opens and closes the cover.

20 Claims, 7 Drawing Sheets

(56)        References Cited

U.S. PATENT DOCUMENTS

2014/0197618 A1 *   7/2014   Schott ................... B60D 1/488
                                             280/507
2021/0046792 A1 *   2/2021   Schieber ................. B60D 1/46
2025/0353336 A1 *   11/2025   Goodman ............... B60D 1/06

* cited by examiner

300

320

310

330

AUTOMATED TRAILER HITCH

TECHNICAL FIELD

The technical field of the present disclosure relates to trailer hitch apparatuses and, more particularly, to automated trailer hitch apparatuses and related methods of operation and manufacturing.

BACKGROUND

Traditional trailer hitch technologies usually require manual actions where the user must physically connect and disconnect the hitch ball from the towing vehicle. This process often involves bending down, lining up the hitch ball with the towing component, and locking it in place, which can be awkward and demand considerable physical effort. Additionally, these systems generally lack built-in safety features and are susceptible to user mistakes, leading to potential dangers during towing, such as improperly secured connections that could cause accidents or damage. Consequently, there is a need for an improved trailer hitch design that automates this process, removing the physical exertion for the user, minimizing the chances of incorrect engagement, and facilitating a safer, more efficient towing experience.

SUMMARY

This summary provides a discussion of aspects of certain embodiments of the disclosed principles. It is not intended to limit the disclosed principles, the appended claims or any of the terms in the claims. The summary provides some aspects, but there are aspects and embodiments of the disclosed principles that are not discussed here.

In one aspect, a trailer hitch apparatus is provided. The trailer hitch apparatus can include a plate, a housing, a hitch ball, and a cover. The plate may include a cutout that extends through its thickness, with the cutout having a first receding portion at one end. The housing is attached to a bottom surface of the plate and includes a first sidewall and an opposing second sidewall, both extending along opposite sides of the cutout. The hitch ball includes a shank, a ball, and a hitch ball flange, where the ball is attached to one end of the shank, while the hitch ball flange extends from the opposite end. The hitch ball is rotatably connected to the first and second sidewalls of the housing via a first rod passing through the shank. The hitch ball is configured to rotate between an upright and a collapsed position. The cover is situated within the cutout and rotatably connected to the first and second sidewalls through a second rod attached to a proximal end of the cover. The cover has a second receding portion at its distal end, which, when in a closed position, forms a hole with the first receding portion of the cutout. This hole accommodates the shank of the hitch ball when it is in the upright position.

The trailer hitch apparatus may also include a hitch ball actuator, a hitch ball arm, a cover actuator, and a cover arm. The hitch ball actuator can be attached to a first end of the bottom surface of the plate, and includes a hitch ball actuator flange designed to move between a first position and a second position. The hitch ball arm connects the hitch ball flange to the hitch ball actuator flange. The cover actuator can be attached to an opposing second end of the bottom surface of the plate, and it can include a cover actuator flange that moves between a third and a fourth position. The cover arm connects the cover actuator flange to a housing flange, which is connected to one end of the second rod.

When the hitch ball is in the collapsed position, the hitch ball actuator and the cover actuator are configured to receive signals that cause the cover actuator to move the cover actuator flange into the third position, placing the cover in an open position. In response, the hitch ball actuator moves the hitch ball actuator flange to the first position, positioning the hitch ball in the upright position. Then, the cover actuator moves the cover actuator flange into the fourth position, positioning the cover in the closed position and enclosing the shank within the hole.

When the hitch ball is in the upright position, the hitch ball actuator and the cover actuator are configured to receive signals that cause the cover actuator to move the cover actuator flange into the third position, placing the cover in the open position. In response, the hitch ball actuator moves the hitch ball actuator flange to the second position, placing the hitch ball in the collapsed position. Then, the cover actuator moves the cover actuator flange into the fourth position, positioning the cover in the closed position.

In one embodiment, the shank is cylindrical, and the first and second receding portions are concave, forming a substantially circular hole that accommodates the shank.

In another embodiment, the hitch ball is contained entirely within the housing.

In another embodiment, the housing can also include a third sidewall, which may have a cutout configured to accommodate the hitch ball actuator flange.

In another embodiment, the cover may also include an aperture configured to receive a pulling force to place the cover in the open position.

In yet another embodiment, when the hitch ball is in the collapsed position, the hitch ball actuator begins moving the hitch ball actuator flange to the first position after the cover actuator moves the cover actuator flange a first predetermined distance towards the third position. Additionally, when the hitch ball is in the collapsed position, the cover actuator begins moving the cover actuator flange into the fourth position after the hitch ball actuator moves the hitch ball actuator flange a second predetermined distance towards the first position. Additionally, or alternatively, when the hitch ball is in the upright position, the hitch ball actuator begins moving the hitch ball actuator flange to the second position after the cover actuator moves the cover actuator flange a first predetermined distance towards the third position. Additionally, when the hitch ball is in the upright position, the cover actuator begins moving the cover actuator flange into the fourth position after the hitch ball actuator moves the hitch ball actuator flange a second predetermined distance towards the second position.

In another aspect, a trailer hitch system is provided. The system can include a plate, a housing, a hitch ball, and a cover. The plate can include a cutout that extends through its thickness, with the cutout having a first receding portion at one end. The housing is attached to a bottom surface of the plate and includes a first sidewall and an opposing second sidewall, both extending along opposite sides of the cutout. The hitch ball includes a shank, a ball, and a hitch ball flange; the ball is attached to one end of the shank, while the hitch ball flange extends from the opposite end. The hitch ball is rotatably connected to the first and second sidewalls of the housing via a first rod passing through the shank. The hitch ball is configured to rotate between an upright and a collapsed position. The cover is situated within the cutout and rotatably connected to the first and second sidewalls through a second rod attached to a proximal end of the cover.

The cover has a second receding portion at its distal end, which, when in a closed position, forms a hole with the first receding portion of the cutout. This hole accommodates the shank of the hitch ball when it is in the upright position.

The trailer hitch apparatus may also include a hitch ball actuator, a hitch ball arm, a cover actuator, a cover arm, and a processor. The hitch ball actuator can be attached to a first end of the bottom surface of the plate, and it includes a hitch ball actuator flange designed to move between a first and second position. The hitch ball arm connects the hitch ball flange to the hitch ball actuator flange. The cover actuator can be attached to an opposing second end of the bottom surface of the plate, and the cover actuator can include a cover actuator flange that moves between a third and a fourth position. The cover arm connects the cover actuator flange to a housing flange, which is attached to one end of the second rod. The processor communicates with the hitch ball actuator and the cover actuator. The processor is configured to cause the cover actuator to move the cover actuator flange to the third or fourth positions, thereby opening or closing the cover. The processor is also configured to cause the hitch ball actuator to move the hitch ball actuator flange to the first or second positions, thereby positioning the hitch ball in the upright or collapsed position.

In one embodiment, when the hitch ball is in the collapsed position, the hitch ball actuator begins moving the hitch ball actuator flange to the first position after the cover actuator moves the cover actuator flange a first predetermined distance towards the third position. Additionally, when the hitch ball is in the collapsed position, the cover actuator begins moving the cover actuator flange into the fourth position after the hitch ball actuator moves the hitch ball actuator flange a second predetermined distance towards the first position. Additionally, or alternatively, when the hitch ball is in the upright position, the hitch ball actuator begins moving the hitch ball actuator flange to the second position after the cover actuator moves the cover actuator flange a first predetermined distance towards the third position. Additionally, when the hitch ball is in the upright position, the cover actuator begins moving the cover actuator flange into the fourth position after the hitch ball actuator moves the hitch ball actuator flange a second predetermined distance towards the second position.

In another embodiment, the housing can include a third sidewall, which can have a cutout configured to accommodate the hitch ball actuator flange. Additionally, or alternatively, the hitch ball can be contained entirely within the housing in the collapsed position.

BRIEF DESCRIPTION OF THE DRAWINGS

The preceding aspects and many of the attendant advantages of the presently disclosed principles will become more readily appreciated by reference to the following Detailed Description when taken in conjunction with the accompanying simplified drawings of example embodiments. The drawings briefly described below are presented for ease of explanation and do not limit the scope of the claimed subject matter.

DETAILED DESCRIPTION

The disclosed principles relate to a versatile trailer hitch apparatus designed for easy installation and operation within a truck bed or on gooseneck installation brackets. This apparatus features an adjustable hitch ball that can rotate or pivot between an upright and a collapsed position, providing convenient access and storage when not in use. The design includes a housing with integrated actuator mechanisms that improve user interaction, enabling smooth transitions between different configurations. The apparatus offers enhanced accessibility for hitching and unhitching trailers, efficient use of space in the truck bed, the ability to adapt to various hitch ball designs due to its customizable cover configuration, and ensures smooth operation while securely locking the hitch ball when not in use.

Figure 1:
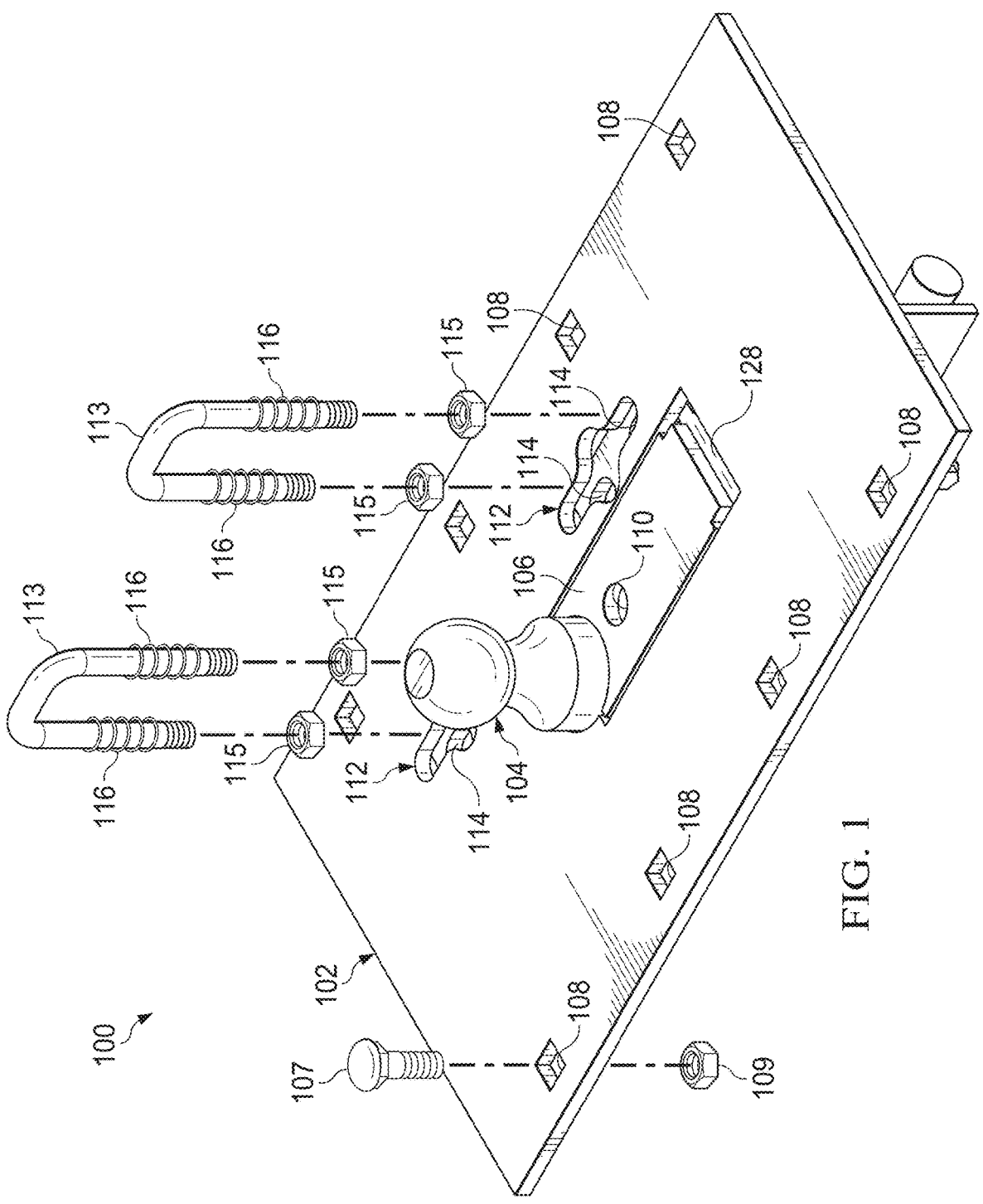
FIG. 1 depicts a top isometric view of one embodiment of a trailer hitch apparatus in an upright configuration, in accordance with the disclosed principles.
Figure 2:
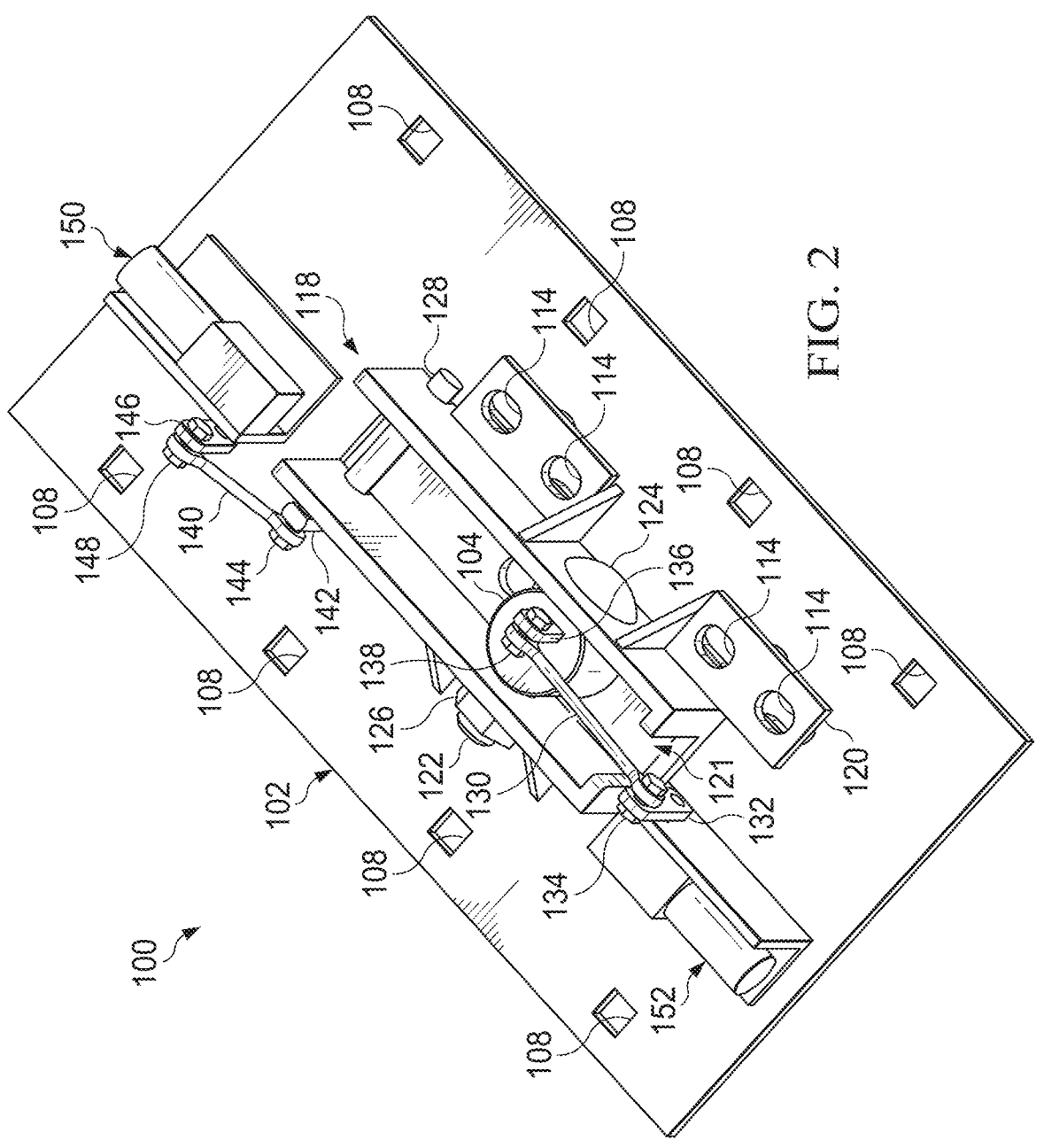
FIG. 2 depicts a bottom isometric view of the trailer hitch apparatus of FIG. 1.

FIG. 1, illustrates a top isometric view of an embodiment of a trailer hitch apparatus 100, in accordance with the disclosed principles, in an upright position. FIG. 2 illustrates a bottom isometric view of the trailer hitch apparatus 100. Referring collectively to FIGS. 1 and 2, the trailer hitch apparatus 100 includes a plate 102 designed to be installed in a truck bed or on gooseneck installation brackets (not shown).

A hitch ball 104 extends through a cutout in the plate 102 when the hitch ball 104 is in the upright position. As shown in FIG. 2, the hitch ball 104 is located within the sidewalls of a housing 118 attached to the bottom surface of the plate 102. The hitch ball 104 is rotatably or pivotally connected to the sidewalls of the housing 118 via a first rod 122 passing through the shank of the hitch ball 104. As depicted in FIG. 2, the head 124 of the first rod 122 can secure the rod 122 to one sidewall, while a nut 126 secures the rod 122 to the opposing sidewall.

Figure 6:
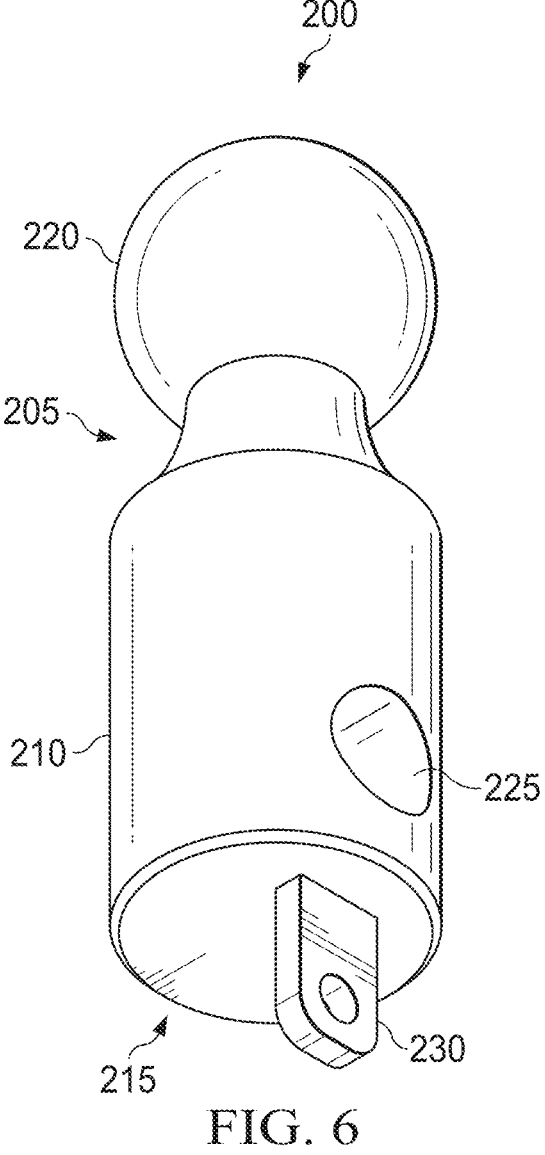
FIG. 6 depicts an embodiment of a hitch ball of the trailer hitch apparatus of FIG. 1.

Referring briefly to FIG. 6, an embodiment of a hitch ball 200 in accordance with the disclosed principles is shown. The hitch ball 200 has a ball 220 attached to (or formed on) the distal end 205 of the shank 210, and a hitch ball flange 230 extending from the bottom (or proximal) end 215 of the shank 210. The shank 210 features an aperture (or through bore) 225 extending orthogonally through the diameter of the shank 210, which is designed to accommodate a rod (such as rod 122, introduced above) to rotate the hitch ball 200 between an upright position and a collapsed position.

Turning back to FIG. 2, a hitch ball actuator 152 is attached to a first end of the bottom surface of the plate 102. A hitch ball actuator flange 132 is rotatably connected to the hitch ball actuator 152 and can be rotated between a first and second position. As shown in FIG. 2, the hitch ball actuator flange 132 is in the first position. The hitch ball 104 has a hitch ball flange 136 extending from its bottom end. A hitch ball arm 130 connects the hitch ball actuator flange 132 and the hitch ball flange 136. The hitch ball arm 130 is secured to the hitch ball actuator flange 132 with a first bolt 134 or other securing means, and to the hitch ball flange 136 with a second bolt 138 or other securing means. In this embodiment, the housing 118 includes a third sidewall with a cutout 121 designed to accommodate the hitch ball arm 130. In exemplary embodiments, the hitch ball actuator 152 may be an electromagnetic actuator, but other types of actuators may also be employed.

The plate 102 also has a cover actuator 150 attached to its bottom surface at the end opposite than the hitch ball actuator 152. A cover actuator flange 146 is rotatably connected to the cover actuator 150 and designed to rotate between a third and a fourth position. As shown in FIG. 2, the cover actuator flange 146 is in the fourth position. The cover 106 is rotatably connected to the sidewalls of the housing 118 through a second rod 128, which is attached to the proximal end of the cover 106. A housing flange 142 is connected to the second rod 128. A cover arm 140 interconnects the cover actuator flange 146 and the housing flange 142. The cover arm 140 is secured to the housing flange 142 with a third bolt 144 or other securing means, and to the cover actuator flange 146 with a fourth bolt 148 or other securing means. The cover 106 also features a cover aperture 110, designed to receive a pulling force (e.g., a user's finger pulling the cover open). As described herein, the cover aperture 110 enables manual operation of the cover 106. In such embodiments, this manual operation by a user may override the hitch ball actuator and cover actuator, may manually operate the hitch ball actuator and cover actuator, or may cause the activation of the hitch ball actuator and cover actuator thus operating as a control signal to those actuators.

Figure 3:
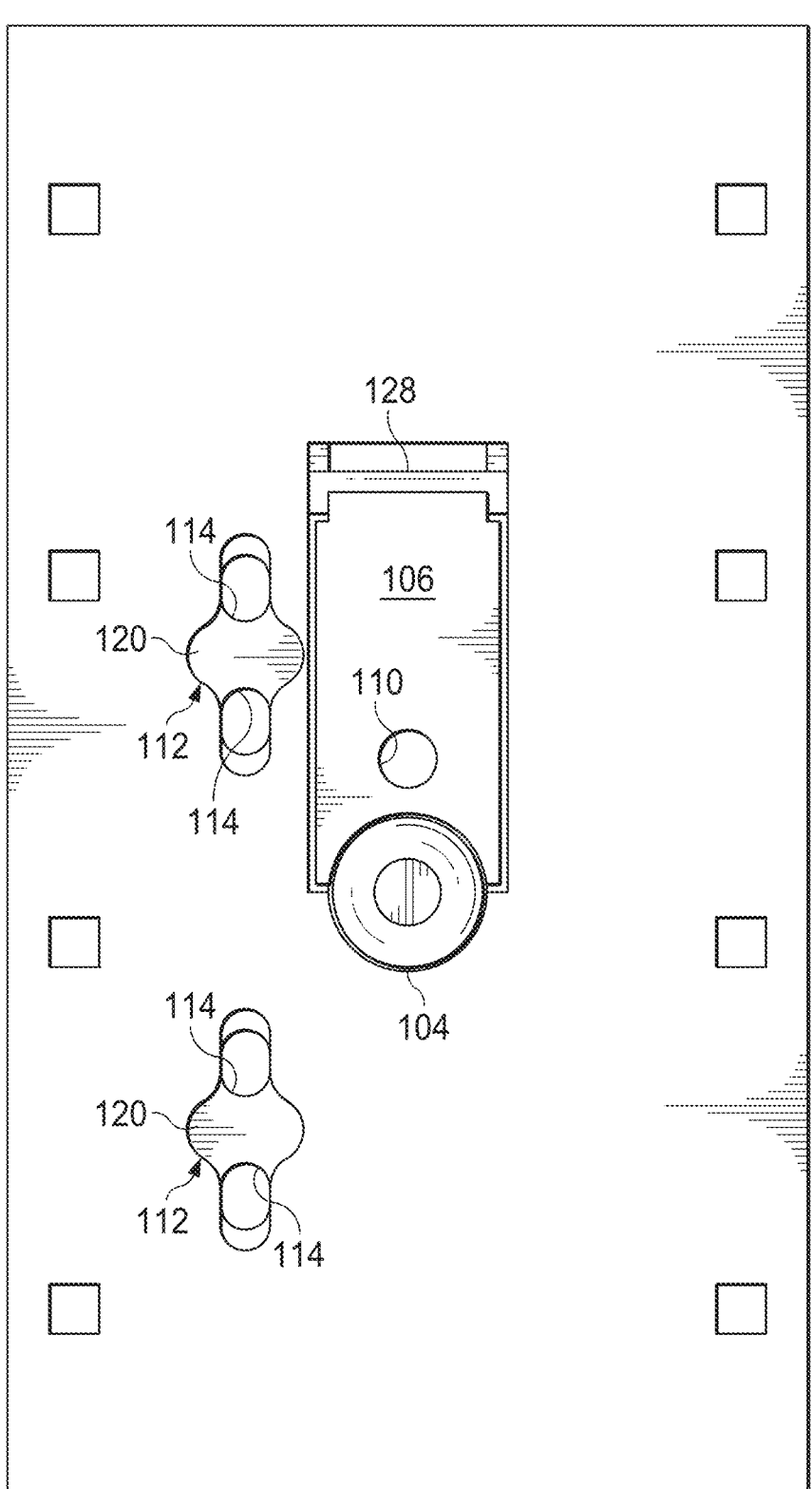
FIG. 3 depicts a top view of the trailer hitch apparatus of FIG. 1.

FIG. 3 illustrates a top view of the trailer hitch apparatus of FIGS. 1-2. Referring to FIGS. 1-3 collectively, the plate 102 has multiple peripheral apertures 108 along its opposing longitudinal sides. These apertures 108 are designed to receive a carriage bolt 107, allowing the trailer hitch apparatus 100 to be attached to a truck bed or gooseneck installation bracket (not illustrated). A carriage bolt nut 109 threads onto the carriage bolt 107 to secure the trailer hitch apparatus 100 in place. The plate 102 also features several U-bracket engagement interfaces 112 that are configured to accommodate U-bolts 113. The U-bolts 113 include springs 116 and nuts 115, and are inserted into the U-bracket engagement interfaces 112 and through the support apertures 114 of the housing support 120.

Figure 4:
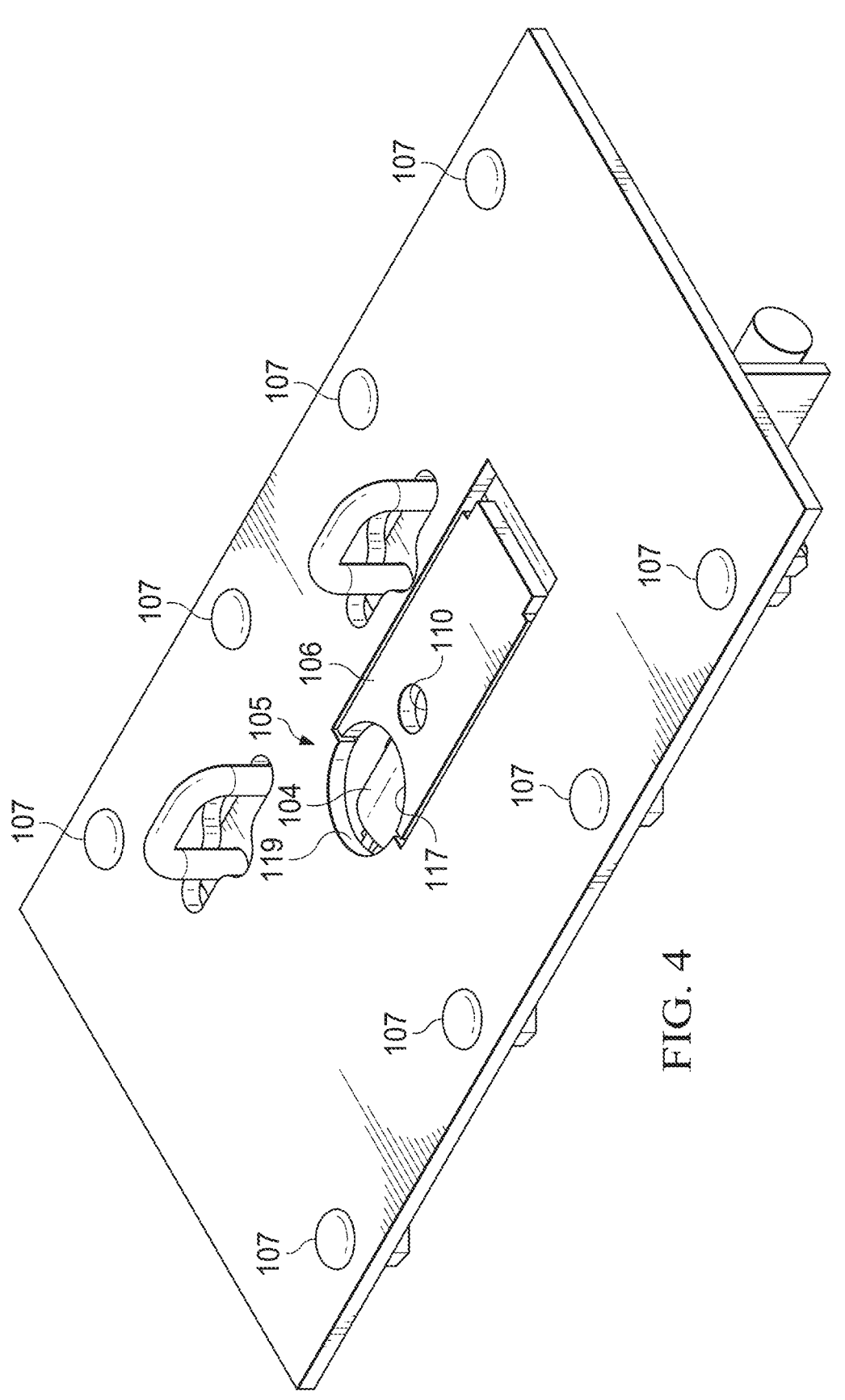
FIG. 4 depicts a top isometric view of the trailer hitch apparatus of FIG. 1 in a collapsed configuration.
Figure 5:
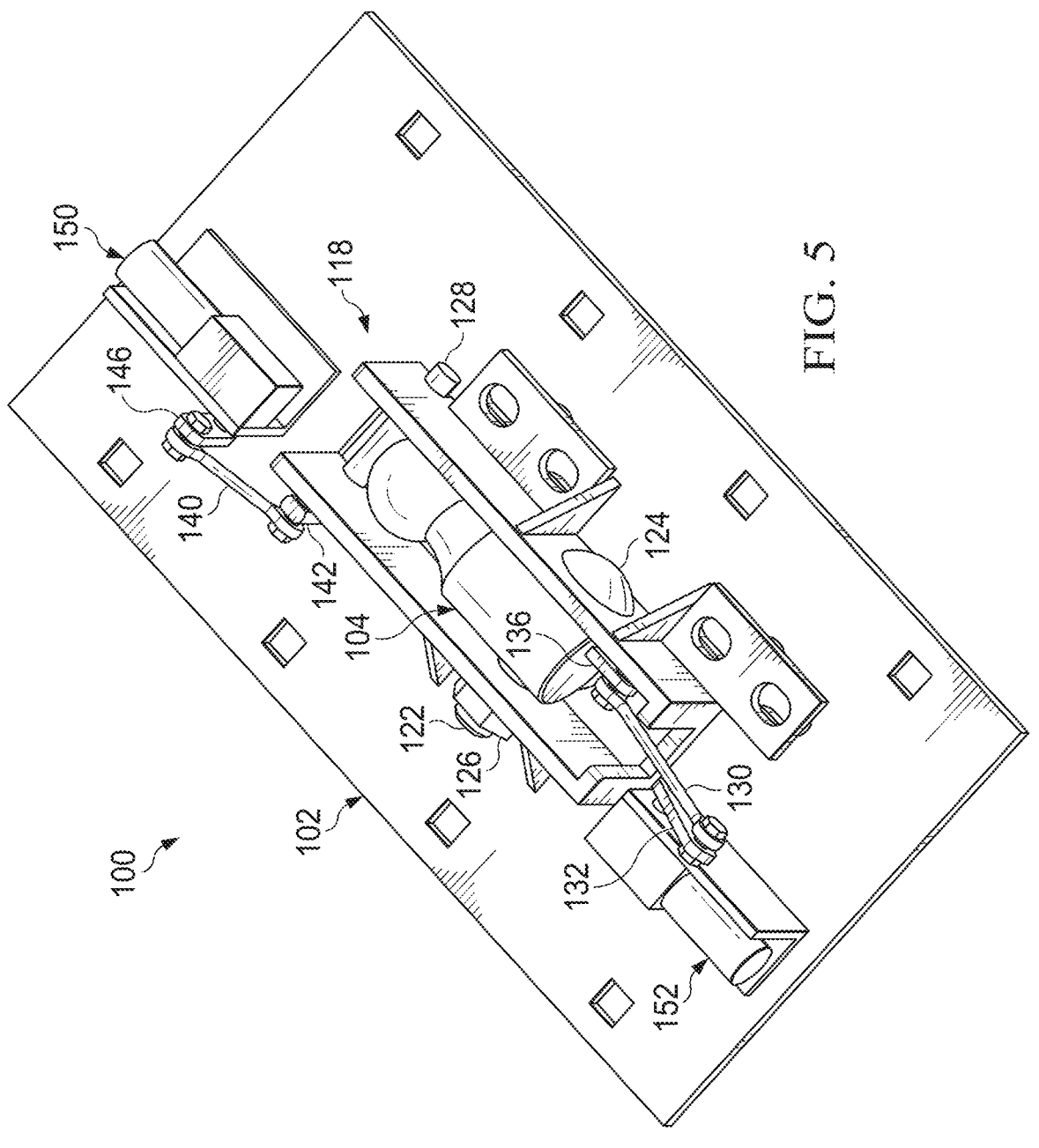
FIG. 5 depicts a bottom isometric view of the trailer hitch apparatus of FIG. 1 in a collapsed configuration.

Turning to FIG. 4 and FIG. 5, top and bottom isometric views, respectively, of an embodiment of the trailer hitch apparatus 100 in accordance with the disclosed principles in a collapsed configuration are shown. As seen in FIG. 4, the cutout in the plate 102 has a semicircular receding portion 119 at one end, and the cover 106 has a corresponding semicircular receding portion 117 at its distal end. In this embodiment, the receding portion 119 of the cutout is convex, and the receding portion 117 of the cover 106 is concave. When the cover 106 is in the closed position (as shown in FIG. 4), the convex and concave shapes of the cutout and cover 106 meet to create a substantially circular hole 105, which is sized to fit the shank of the hitch ball 104. While the convex and concave receding portions of the cutout and cover 106 are depicted as semicircular, these portions can be designed to form a hole with various shapes (e.g., triangle, square, pentagon, hexagon, etc.) to match a hitch ball of a corresponding shape 104. In advantageous embodiments, the hole formed by the receding portions 117, 119 is substantially the same size as the shank of the hitch ball 104. Such a configuration provides structural stability and support for holding the hitch ball 104 in the upright position during use in towing.

Referring to FIG. 5, the hitch ball 104 is in the collapsed position and is enclosed by the sidewalls of the housing 118 and the cover 106. When in this position, the hitch ball actuator 152 moves the hitch ball actuator flange 132 into the second position. As explained further, the cover actuator 150 opens and closes the cover 106 by shifting the cover actuator flange 146 between the third and fourth positions.

Figure 7:
FIG. 7 depicts a simplified diagram of a trailer hitch system in accordance with the disclosed principles implemented in an automobile.

Turning to FIG. 7, a simplified diagram of a trailer hitch system 300 in accordance with the disclosed principles implemented in an automobile 320 is shown. The trailer hitch system 300 includes a trailer hitch apparatus 310 (according to the embodiments disclosed herein) installed in the bed of the automobile 320 (or gooseneck installation brackets) and a processor 330, which may be installed in the control panel in the passenger compartment of the automobile 320. The trailer hitch system 300 advantageously enables a user to manipulate the positioning of the hitch ball of the trailer hitch apparatus 310 using the control panel without manually positioning the hitch ball. One benefit is that remote operation of the trailer hitch apparatus 310 reduces the risk of injury when setting up the trailer hitch apparatus 310 for use with a trailer. In at least one embodiment, the processor 330 can be configured to communicate with a remote device (e.g., a smartphone, tablet, computer, etc.) to control the trailer hitch apparatus 310. Therefore, a user can operate the trailer hitch apparatus 310 remotely whenever needed, in addition to or in place of, operation via a control panel in the automobile 320.

Example Operation

In accordance with the disclosed principles, examples of trailer hitch apparatus operation of an automated trailer hitch designed and constructed in accordance with the disclosed principles are provided below.

Example 1: Upright to Collapsed Position

Referring to FIGS. 1-5, when the hitch ball 104 is in the upright position, the hitch ball actuator flange 132 is in the first position. To move the hitch ball 104 from the upright position (see, e.g., FIG. 1) to the collapsed position (see, e.g., FIG. 5), a processor transmits signals to the hitch ball actuator 152 and the cover actuator 150 to perform the repositioning. In response to receiving a signal from the processor, the cover actuator 150 repositions the cover actuator flange 146 from the fourth position (e.g., perpendicular to the plate 102 as shown in FIG. 2) to the third position (e.g., an angle less than perpendicular to the plate 102). As the cover actuator flange 146 moves into the third position, the housing flange 142 rotates about the second rod 128, opening the cover 106. Similarly, in response to receiving a signal from the processor, the hitch ball actuator 152 moves the hitch ball actuator flange 132 from the first position (e.g., an angle perpendicular to the plate 102 as shown in FIG. 2) to the second position (e.g., an angle less than perpendicular to the plate 102 as shown in FIG. 5). As the hitch ball actuator flange 132 shifts into the second position, the hitch ball arm 130 rotates the hitch ball 104 from the upright to the collapsed position as the hitch ball 104 rotates with the first rod 122.

In one embodiment, the hitch ball actuator 152 moves the hitch ball to the collapsed position simultaneously as the cover actuator 150 moves the cover 106 to the open position. In this embodiment, the cover 106 moves at a rate that is at least equal to that of the hitch ball 104, allowing the hitch ball 104 to clear the cover 106 as it transitions to the collapsed position. In an alternative embodiment, the hitch ball actuator 152 begins moving the hitch ball 104 into the collapsed position after the cover actuator 150 has moved the cover 106 a first predetermined distance toward the open position. Alternatively, the hitch ball actuator 152 starts moving the hitch ball 104 into the collapsed position at a predetermined period of time after the cover actuator 150 has begun moving the cover 106 into the open position. In yet other embodiments, the hitch ball actuator 152 starts moving the hitch ball 104 into the collapsed position only after the cover actuator 150 has finished moving the cover 106 into the open position.

The cover actuator 150 then moves the cover 106 back to the closed position by returning the cover actuator flange 146 to the fourth position (as shown in FIGS. 4 and 5). In one embodiment, the cover actuator 150 starts closing the cover 106 after the hitch ball actuator 152 has moved the hitch ball 104 a second predetermined distance toward the collapsed position. Alternatively, the cover actuator 150 begins closing the cover 106 at a predetermined time after the hitch ball actuator 152 starts moving the hitch ball 104 into the collapsed position. In yet other embodiments, the cover actuator 150 starts moving the cover 106 into the closed position only after the hitch ball actuator 152 has finished moving the hitch ball 104 into the collapsed position.

In any of the embodiments disclosed herein, the rate at which the hitch ball 104 and the cover 106 move should be such that the components do not collide.

Example 2: Collapsed to Upright Position

With continued reference to FIGS. 1-5, transitioning the hitch ball 104 from the collapsed position to the upright position can be performed in the opposite manner described in Example 1. For instance, when the hitch ball 104 is in the collapsed position, the hitch ball actuator flange 132 is in the second position. To move the hitch ball 104 from the collapsed position (see, e.g., FIG. 5) to the upright position (see, e.g., FIG. 1), a processor transmits signals to the hitch ball actuator 152 and the cover actuator 150 to carry out the repositioning. Upon receiving a signal, the cover actuator 150 moves the cover actuator flange 146 from the fourth to the third position, opening the cover 106. Similarly, the processor signals the hitch ball actuator 152 to move the hitch ball actuator flange 132 from the second position (as seen in FIG. 5) to the first position (as seen in FIG. 1). As the hitch ball actuator flange 132 moves into the first position, the hitch ball 104 is repositioned from the collapsed to the upright position. The cover 106 may then be closed, and in advantageous embodiments such that the recessed portions 117, 119 surround and support the upright hitch ball 104.

In accordance with the previously described embodiments, the hitch ball actuator 152 starts moving the hitch ball 104 to the upright position at the same time that the cover actuator 150 moves the cover 106 to the open position. In this embodiment, the cover 106 moves at a rate that is at least equal to the rate at which the hitch ball 104 moves to ensure that the hitch ball 104 clears the cover 106 as it transitions to the collapsed position. In an alternative embodiment, the hitch ball actuator 152 begins moving the hitch ball 104 into the upright position after the cover actuator 150 has moved the cover 106 a first predetermined distance toward the open position. Alternatively, the hitch ball actuator 152 starts moving the hitch ball 104 into the upright position at a predetermined period of time after the cover actuator 150 begins moving the cover 106 into the open position. In yet other embodiments, the hitch ball actuator 152 starts moving the hitch ball 104 into the upright position only after the cover actuator 150 has moved the cover 106 into the open position.

The cover actuator 150 can then move the cover 106 back to the closed position by shifting the cover actuator flange 146 to the fourth position (as shown in FIGS. 4 and 5), as discussed above. In one embodiment, the cover actuator 150 starts moving the cover 106 into the closed position after the hitch ball actuator 152 moves the hitch ball 104 a second predetermined distance toward the upright position. Alternatively, the cover actuator 150 begins closing the cover 106 at a predetermined time after the hitch ball actuator 152 starts moving the hitch ball 104 into the upright position, or only after the hitch ball actuator 152 starts moving the hitch ball 104 into the upright position.

In any of the embodiments disclosed herein, the rate at which the hitch ball 104 and the cover 106 move should be such that the components do not collide.

As used herein, the term "about" can be understood as the disclosed values varying by 20-25%, 15-20%, 10-15%, 5-10%, 1-5%, or any combination thereof from the listed values.

Additionally, the section headings herein are provided for consistency with the suggestions under 37 C.F.R. § 1.77 or to provide organizational cues. These headings shall not limit or characterize the invention(s) set out in any claims that may issue from this disclosure. Specifically, and by way of example, although the headings refer to a "Technical Field," the claims should not be limited by the language chosen under this heading to describe the so-called field. Further, a description of a technology as background information is not to be construed as an admission that a particular technology is prior art to any embodiment(s) in this disclosure. Neither is the "Summary" a characterization of the embodiment(s) outlined in issued claims.

Furthermore, any reference in this disclosure to "invention" in the singular should not be used to argue that there is only a single point of novelty in this disclosure. Multiple embodiments may be set forth according to the limitations of the multiple claims issuing from this disclosure. Such claims accordingly define the embodiment(s) and their equivalents that are protected thereby. In all instances, the scope of such claims shall be considered on their own merits in light of this disclosure but should not be constrained by the headings set forth herein.

Moreover, the Abstract is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the preceding Detailed Description, it can be seen that various features may be grouped in a single embodiment to streamline the disclosure. This method of disclosure is not to be interpreted as reflecting an intention that the claimed embodiments require more features than are expressly recited in each claim. Instead, as the claims reflect, the inventive subject matter lies in less than all features of a single disclosed embodiment. Thus, the following claims are incorporated into the Detailed Description, with each claim standing on its own as a separate embodiment.

What is claimed is:

1. A trailer hitch apparatus, comprising:

a plate comprising a cutout extending through a thickness of the plate;

a hitch ball comprising a shank, a ball, and a hitch ball flange, wherein the ball is affixed to a first end of the shank, and the hitch ball flange extends from an opposing second end of the shank, and wherein the hitch ball is configured to rotate between an upright position and a collapsed position through the cutout;

a cover disposed within the cutout and configured to rotate between an open and closed position;

a hitch ball actuator affixed to a first end of a bottom surface of the plate and configured to move the hitch ball between the upright position and collapsed position;

a cover actuator affixed to an opposing second end of the bottom surface of the plate; and wherein when the hitch ball is in the collapsed position:

the cover actuator is configured to cause, in response to a control signal, the cover to transition from the closed position to the open position, the hitch ball actuator is configured to cause, in response to the control signal, the hitch ball to transition from the collapsed position to the upright position, and then the cover actuator is configured to cause, as the hitch ball is moving to or has moved into the upright position, the cover to transition from the open position to the closed position; and wherein when the hitch ball is in the upright position:

the cover actuator is configured to cause, in response to a control signal, the cover to transition from the closed position to the open position, the hitch ball actuator is configured to cause, in response to the control signal, the hitch ball to transition from the upright position to the collapsed position, and then the cover actuator is configured to cause, as the hitch ball is moving to or has moved into the collapsed position, the cover to transition from the open position to the closed position.

2. The trailer hitch apparatus of claim 1, wherein the cutout comprises a first receding portion at a first end, and wherein the cover comprises a second receding portion at a distal end of the cover to form a hole with the first receding portion of the cutout when the cover is in the closed position.

3. The trailer hitch apparatus of claim 2, wherein the hole is sized substantially equal to a width of the shank of the hitch ball when the hitch ball is in the upright position thereby providing structural support for the hitch ball.

4. The trailer hitch apparatus of claim 1, further comprising:

a housing affixed to a bottom surface of the plate, wherein the housing comprises a first sidewall and an opposing second sidewall, each extending along respective opposing sides of the cutout;

wherein the hitch ball is rotatably coupled to the first and second sidewalls of the housing via a first rod extending through the shank; and wherein the cover is rotatably coupled to the first and second sidewalls of the housing via a second rod attached to a proximal end of the cover.

5. The trailer hitch apparatus of claim 1, wherein the hitch ball actuator comprises:

a hitch ball actuator flange configured to be moved between a first position and a second position; and a hitch ball arm interconnected between the hitch ball flange and the hitch ball actuator flange.

6. The trailer hitch apparatus of claim 5, wherein the cover actuator comprises:

a cover actuator flange configured to be moved between a third position and a fourth position; and a cover arm interconnected between the cover actuator flange and a housing flange, wherein the housing flange is connected to an end of the second rod.

7. The trailer hitch apparatus of claim 6, wherein when the hitch ball is in the collapsed position:

the cover actuator moves the cover actuator flange into the third position to place the cover in the open position;

the hitch ball actuator moves the hitch ball actuator flange to the first position to place the hitch ball in the upright position; and the cover actuator moves the cover actuator flange into the fourth position to place the cover in the closed position.

8. The trailer hitch apparatus of claim 7, wherein when the hitch ball is in the upright position:

the cover actuator moves the cover actuator flange into the third position to place the cover in the open position;

the hitch ball actuator moves the hitch ball actuator flange to the second position to place the hitch ball in the collapsed position; and the cover actuator moves the cover actuator flange into the fourth position to place the cover in the closed position.

9. The trailer hitch apparatus of claim 8, wherein when the hitch ball is in the collapsed position:

the hitch ball actuator begins moving the hitch ball actuator flange to the first position after the cover actuator moves the cover actuator flange a first predetermined distance towards the third position; and the cover actuator begins moving the cover actuator flange into the fourth position after the hitch ball actuator moves the hitch ball actuator flange a second predetermined distance towards the first position.

10. The trailer hitch apparatus of claim 8, wherein when the hitch ball is in the upright position:

the hitch ball actuator begins moving the hitch ball actuator flange to the second position after the cover actuator moves the cover actuator flange a first predetermined distance towards the third position; and the cover actuator begins moving the cover actuator flange into the fourth position after the hitch ball actuator moves the hitch ball actuator flange a second predetermined distance towards the second position.

11. The trailer hitch apparatus of claim 8, wherein when the hitch ball is in the upright position:

the hitch ball actuator begins moving the hitch ball actuator flange to the second position after the cover actuator moves the cover actuator flange a first predetermined distance towards the third position; and the cover actuator begins moving the cover actuator flange into the fourth position after the hitch ball actuator moves the hitch ball actuator flange a second predetermined distance towards the second position.

12. The trailer hitch apparatus of claim 1, wherein the cover further comprises an aperture configured to receive a pulling force to place the cover in the open position, and wherein said received pulling force further causes the hitch ball to be moved between the collapsed and upright positions.

13. The trailer hitch apparatus of claim 1, wherein the hitch ball is contained entirely within the housing when in the collapsed position.

14. A trailer hitch system, comprising:

a plate comprising a cutout extending through a thickness of the plate;

a hitch ball comprising a shank and a ball, wherein the hitch ball is configured to rotate between an upright position at least partially above a top surface of the plate and a collapsed position entirely under the top surface of the plate through the cutout;

a cover covering the cutout and configured to rotate between an open and closed position;

a hitch ball actuator affixed to a first end of a bottom surface of the plate and configured to move the hitch ball between the upright position and collapsed position;

a cover actuator affixed to an opposing second end of the bottom surface of the plate and configured to move the cover between the closed position and open position; and a processor in communication with the hitch ball actuator and the cover actuator, wherein, in response to an input from a user, the processor is configured to:

cause the cover actuator to move the cover between the closed position to the open position; and cause the hitch ball actuator to move the hitch ball between the collapsed position to the upright position;

wherein the cover actuator moves the cover between the open position and the closed position as the hitch ball is moving or has moved between the upright position and collapsed position.

15. The trailer hitch system of claim 14, wherein the cutout comprises a first receding portion at a first end, and wherein the cover comprises a second receding portion at a distal end of the cover to form a hole with the first receding portion of the cutout when the cover is in the closed position.

16. The trailer hitch system of claim 15, wherein the hole is sized substantially equal to a width of the shank of the hitch ball when the hitch ball is in the upright position thereby providing structural support for the hitch ball.

17. The trailer hitch system of claim 14, further comprising:

a housing affixed to a bottom surface of the plate, wherein the housing comprises a first sidewall and an opposing second sidewall, each extending along respective opposing sides of the cutout;

wherein the hitch ball is rotatably coupled to the first and second sidewalls of the housing via a first rod extending through the shank; and wherein the cover is rotatably coupled to the first and second sidewalls of the housing via a second rod attached to a proximal end of the cover.

18. The trailer hitch system of claim 17, wherein:

the hitch ball actuator comprises:

a hitch ball actuator flange configured to be moved between a first position and a second position; and a hitch ball arm interconnected between the hitch ball actuator flange and a hitch ball flange on the hitch ball opposite the ball; and the cover actuator comprises:

a cover actuator flange configured to be moved between a third position and a fourth position; and a cover arm interconnected between the cover actuator flange and a housing flange, wherein the housing flange is connected to an end of the second rod.

19. The trailer hitch system of claim 18, further wherein when the hitch ball is in the collapsed position:

the cover actuator moves the cover actuator flange into the third position to place the cover in the open position; and the hitch ball actuator moves the hitch ball actuator flange to the first position to place the hitch ball in the upright position; and the cover actuator moves the cover actuator flange into the fourth position to place the cover in the closed position.

20. The trailer hitch system of claim 19, further wherein when the hitch ball is in the upright position:

the cover actuator moves the cover actuator flange into the third position to place the cover in the open position;

the hitch ball actuator moves the hitch ball actuator flange to the second position to place the hitch ball in the collapsed position; and the cover actuator moves the cover actuator flange into the fourth position to place the cover in the closed position.

* * * * *